No. 678,222. Patented July 9, 1901.
D. G. CHANDLER.
MOLE TRAP.
(Application filed Mar. 26, 1901.)
(No Model.)
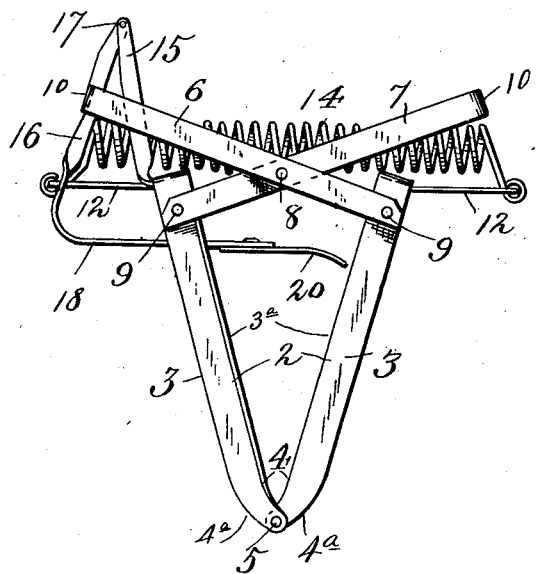
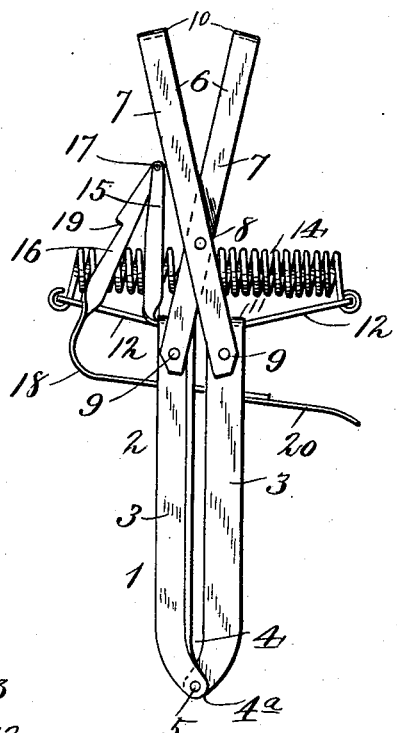
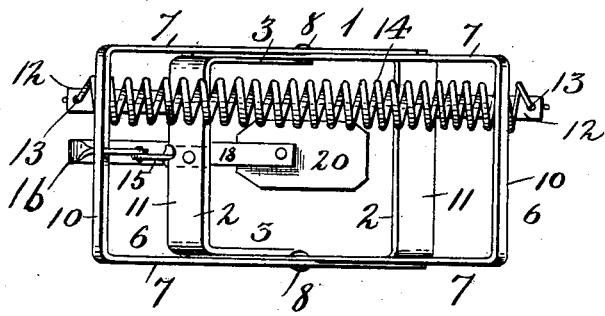
Witnesses:
Franck L. Ourand.
F. G. Radelfinger.
Inventor
Dana G. Chandler,
By Louis Bagger & Co.,
Attorneys.

UNITED STATES PATENT OFFICE.

DANA G. CHANDLER, OF SYLVANIA, OHIO.

MOLE-TRAP.

SPECIFICATION forming part of Letters Patent No. 678,222, dated July 9, 1901.

Application filed March 26, 1901. Serial No. 52,990. (No model.)

*To all whom it may concern:*

Be it known that I, DANA G. CHANDLER, a citizen of the United States, residing at Sylvania, in the county of Lucas and State of Ohio, have invented new and useful Improvements in Mole-Traps, of which the following is a specification.

My invention relates to mole-traps, and has for its object the construction of a trap which can be forced down through the roof of a mole-run and set astride the same in readiness to be sprung by a mole in his attempt to force his way through the run. This object is attained by the simple and novel construction described in this specification and claimed, and illustrated in the accompanying drawings, forming a part thereof, in which—

Figure 1 is a side elevation of my trap set. Fig. 2 is a similar view sprung. Fig. 3 is a plan view of the trap set.

Like numerals of reference designate like parts in the different views of the drawings.

The numeral 1 designates my trap, the jaws of which consist of a first pair of U-shaped frames 2, the arms 3 of which are slightly curved at 4, rounded off at 4ª, and hinged together at their extremes 5. By virtue of this construction the arms 3 form two pairs of jaws. These jaws are sharpened on their inner sides 3ª to a knife-edge.

The setting-levers for my trap comprise a second pair of U-shaped frames 6, the arms 7 of which are hinged intermediate their ends on pivots 8. The lower ends of the arms 7 are pivoted to the upper ends of the arms 3 by pintles 9. The cross-bars 10 of the frames 6 form a pair of handles for use in setting the trap.

Secured to the cross-bars 11 of the frames 2 are horizontal arms 12, apertured near their outer ends at 13. The arms 12 support a stiff spiral spring 14, having its extremes secured in the apertures 13, which spring is designed to actuate the jaws and hold them against opening. A vertical arm 15 is also rigidly secured to the cross-bar 11 of one of the frames 2 and supports a trigger-lever 16, fulcrumed on a pivot 17, mounted in the upper end of the arm 15. The lever 16 is bent at right angles at 18. It is notched at 19 and bears a plate 20 on its outer end. The notch is positioned to engage the cross-bar 10 of one of the frames 6 when the trap is set. The plate 20 is designed to bear on the ground and to be disturbed by the mole in forcing his way through the ground, thus springing the trap.

In setting my trap the handles 10 are grasped and the curved rounded ends 4 of the arms 3 forced down through the roof of the mole-run. The handles 10 are then pulled apart, which action is communicated to the jaws of the trap and they are opened. As the jaws are opened the trigger 16 will be brought back in position for the notch 19 to engage the bar 10 and set the trap. The trap can now be adjusted, with the plate 20 resting on the ground, when it will be in a position to be sprung by the mole. It should be noted that the pairs of jaws extend radially and only include an acute angle between them and that the animal is compelled to pass between the pivoted points of the jaws and the trigger in order to spring the trap.

I do not wish to be limited as to details of construction, as these may be modified in many particulars without departing from the spirit of my invention.

Having thus fully described my invention, what I claim as new, and desire to secure by Letters Patent, is—

1. In a device of the class described, the combination, of a first pair of U-shaped frames having the ends of their arms hinged together to form jaws, a second pair of U-shaped frames having their arms hinged together in pairs intermediate their ends and their ends pivoted to said first pair of frames, a spring mounted to actuate said jaws, and means for setting and releasing the jaws.

2. In a device of the class described, the combination, of a first pair of U-shaped frames having their arms hinged together to form jaws, a spring mounted to hold said jaws against opening, a second pair of U-shaped frames having their arms hinged together and pivotally connected to the said arms of the said first pair of U-shaped frames; an arm mounted on the cross-bar of one of the frames of said first pair, and a trigger pivoted to said arm and bearing a notch adapted to engage the cross-bar on one of the frames of said second pair, substantially as described.

3. In a trap, the combination of pivoted radial jaws, a spring mounted to actuate said jaws, and a trigger constructed to be displaced, to spring the trap, by an animal passing between it and the pivoted points of said jaws, substantially as described.

4. In a trap, the combination with a pair of U-shaped frames, the arms of which are pivoted together at their extremes to form jaws, a spring mounted to actuate said jaws, and a trigger constructed to be displaced to spring the trap by an animal passing between it and the pivoted points of said jaws, substantially as described.

In testimony whereof I have hereunto set my hand in presence of two subscribing witnesses.

DANA G. CHANDLER.

Witnesses:
WILLIAM E. CORDILL,
LOUE E. MCCAULAY.